April 11, 1967  A. HADNI  3,313,937
FERRO-ELECTRIC INFRARED DETECTOR HAVING A SEMITRANSPARENT
METALLIZED RADIATION RECEIVING SIDE
Filed Aug. 24, 1964
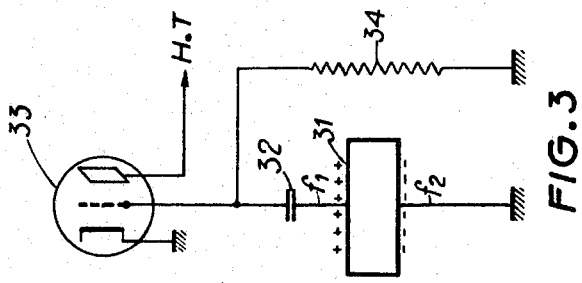
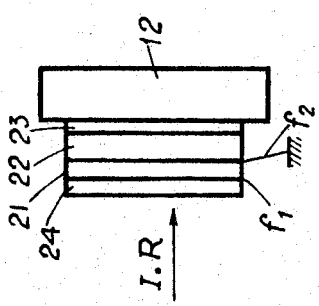
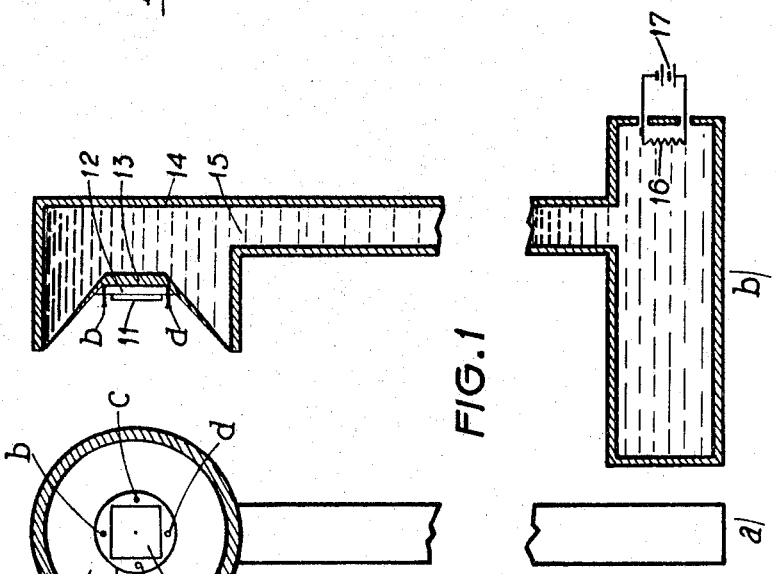
Inventor
Armand Hadni
By Cushman, Darby & Cushman
Attorneys United States Patent Office 3,313,937
Patented Apr. 11, 1967

3,313,937
FERRO-ELECTRIC INFRARED DETECTOR HAVING A SEMITRANSPARENT METALLIZED RADIATION RECEIVING SIDE
Armand Hadni, Paris, France, assignor to CSF—Compagnie Generale de Telegraphie Sans Fil, a corporation of France
Filed Aug. 24, 1964, Ser. No. 391,632
Claims priority, application France, Aug. 26, 1963, 945,646, Patent 1,374,475
6 Claims. (Cl. 250—83)

The present invention relates to radiation and more particularly to infra-red radiation receivers.

Thermal receivers are known which are sensitive to this type of radiation over a wide frequency range, for example, the Golay receiver. However, known receivers cannot respond to rapid luminance variation or undergo modulation at a rate higher than a few tens of cycles per second. Photoconductor receivers have also been devised which are capable of following the modulation of the input signal at high frequencies, for example, 10,000 c./s., but as soon as the wavelength exceeds 10 microns, the sensitive elements of these receivers have to be used in liquid helium.

It is an object of this invention to provide a ferro-electric receiver for infra-red radiation, which is both sensitive over the whole range of the spectrum and capable of following rapid luminosity variations, say of the order of 1000 c./s. and more while operating, whatever the spectrum portion concerned, at temperatures near to 50° C.

According to the invention a ferro-electric receiver comprises a target made of a ferro-electric substance such as triglycine sulphate strip which is semi-metallized, for example with pure gold on the side thereof which is subjected to thermal radiation, and is completely metallized, for example also with pure gold, on its opposite side. The output signal, due to variations in polarization of the strip under the action of the received radiation, is collected at the terminals of two conductors respectively applied to the front and rear sides of the target.

The invention will be better understood from the following description and appended drawing, wherein:

FIGS. 1a and 1b are respectively a front and a sectional view of a preferred embodiment of the invention;

FIG. 2 is an enlarged sectional view of the target; and

FIG. 3 shows a circuit associated with a receiver according to the invention.

The arrangement of FIG. 1 comprises a triglycine sulphate target 11, mounted on a copper support 12, which is held by screws a, b, c and d at the bottom of a cone 13. The shape of the cone determines the maximum acceptable aperture of the incident beam.

Cone 13 builds up one of the walls of a hollow support 14 containing a paraffin bath 15. The paraffin is kept partially molten by means of a heater resistance 16, fed from a source 17. The thermostat so built up maintains the cone at a constant temperature, somewhat lower than the melting point of the paraffin. The internal surface of the cone is blackened. Copper block 12, which carries target 11, is so maintained at a temperature a little below 50° C.

FIG. 2 shows in detail target 11 mounted on the copper block 12.

Target 11 is of a triglycine sulphate strip cut in a direction perpendicular to the crystal binary axis. Preferably it is faced on one of its sides, which side is then metallized with pure gold, at 22, and cemented to a Mylar strip 23, some 5 microns thick, with an appropriate cement, such as cement GE 7 031; the Mylar strip is cemented to the copper strip 12. The opposite side of strip 21 is then faced parallel to the former by reducing the thickness of the strip to about 50 microns, and is then semi-metallized with pure gold, at 24, the metal vaporization being stopped when the resistance of any square portion of the layer reaches about 500 ohms, which ensures practically total absorption of the radiation by the assembly formed by layer 24 and strip 21.

Two screened wires $f1$ and $f2$, this latter being grounded, are applied respectively to the two sides of the strip before they are metallized.

The receiver operates as follows:

On account of its ferro-electric nature, crystal 21 exhibits a spontaneous polarization P, i.e. it is charged in the absence of radiation with an amount of electricity $Q=AP$, where A is the surface area of the strip. P depends on the crystal temperature and is different from zero so long as temperature is below the Curie point.

Under the action of incident radiation, the crystal temperature rises, the spontaneous polarization P is modified and, if a resistor is coupled across the terminals of the target, electric current $$i = A\frac{dP}{dt}$$

flows therein. In order to obtain $i$ maximum, the crystal must be biased a few seconds before operating. The maximum efficiency, is not exactly for the Curie point but for a somewhat lower temperature.

In the arrangement shown in FIG. 3, terminal $f1$ of a receiver 31 according to the invention, whose other terminal $f2$ is grounded, is connected, through a coupling condenser 32, to the grid of a triode 33 which may, for example, form the input stage of a phase detection low-frequency amplifier, (not shown). Variation of the polarization of the strip under the action of the radiation causes a flow of negative charges, from ground towards $f2$, and of positive charges from the grid towards $f1$, which causes a reduction of the voltage drop equal to $Ri$ at the terminals of the load resistance 34 of magnitude R, of triode 33 (the signs + and − represent schematically the charges on the surface of the strip 21 of receiver 33).

An arrangement according to the invention had the following characteristics:

Triode 33: ECC83 or 12AX7
Capacity 32: 0.1 µf.
Resistance 34: 300,000 ohms
Strip 21: 6 mm. x 6 mm., thickness about 50 microns.

The signal-to-noise ratio is comparable to that obtained in a pneumatic receiver and it has been found possible to modulate the infrared signal at 1000 c./s. with no reduction of this ratio.

Strips with an even larger surface area can be used.

Receivers according to the invention have many applications, in particular in all fields in which infra-red radiation receivers, both sensitive over a wide frequency range and capable of following rapid variation of the incident variation intensity are necessary. No detector which is better than the detector of the invention in this latter respect would appear to be known.

As non-restrictive examples the following may be mentioned: spectroscopy, study of rapid thermal phenomena, rapid detection of hot bodies, pyrometry, fire protection devices . . .

Although the invention has been described with reference to a preferred embodiment, it is to be understood that it is in no way restricted to this form of realization, which was given only as an example. In particular, other materials may be used as target, provided they have similar ferro-electric and conducting qualities; comparable results have been obtained with acid potassium phosphate ($PO_4H_2K$) at −150° K. Also, other thermostats can be used.

What is claimed, is:

1. A thermal radiation receiver comprising: a ferro-electrical target element having a semi-transparent, metallized front side for receiving said thermal radiation, and a metallized rear side; two conductors, respectively connected to each of said sides and having respective terminals; and means for collecting an output signal at said terminals.

2. A thermal radiation receiver comprising: a heat conductive hollow support having one face shaped as a concave cone; a ferro-electrical target strip placed at the bottom of said cone, said strip having a semi-transparent, metallized front side for receiving said thermal radiation, and a metallized rear side, said hollow support including means for thermostating said cone; two conductors respectively, connected to each of said sides, and having respective terminals; and means for collecting an output signal at said terminals.

3. A thermal radiation receiver comprising: a triglycine sulphate target element having a pure gold semi-transparent, metallized front side for receiving said thermal radiation and a pure gold metallized rear side; two conductors, respectively connected to each of said sides and having respective terminals; and means for collecting an output signal at said terminals.

4. A thermal radiation receiver comprising: a heat conductive hollow support having one face shaped as a concave cone; a triglycine sulphate target strip placed at the bottom of said cone, said strip having a pure gold semi-transparent, metallized front side for receiving said thermal radiation, and a pure gold metallized rear side, said hollow support including means for thermostating said cone; two conductors, respectively connected to each of said side and having respective terminals; and means for collecting an output signal at said terminals.

5. A thermal radiation receiver comprising: an acid potassium phosphate target element, having semi-transparent, metallized front side for receiving said thermal radiation and metallized rear side; two conductors, respectively connected to each of said sides and having respective terminals; and means for collecting an output signal at said terminals.

6. A thermal radiation receiver comprising: a heat conductive hollow support having one face shaped as a concave cone; an acid potassium phosphate target strip placed at the bottom of said cone, said strip having a semi-transparent, metallized front side for receiving said thermal radiation and a metallized rear side; said hollow support including means for thermostating said cone; two conductors, respectively connected to each of said side and having respective terminals; and means for collecting an output signal at said terminals.

References Cited by the Examiner

UNITED STATES PATENTS

| | | | |
|---|---|---|---|
| 2,947,896 | 8/1960 | Saum et al. | 250—83.3 X |
| 3,091,693 | 5/1963 | Rudomanski et al. | 250—83.3 |
| 3,118,061 | 1/1964 | Bender | 250—83 |

ARCHIE R. BORCHELT, *Primary Examiner.*